United States Patent [19]

Shibata

[11] 3,933,485

[45] Jan. 20, 1976

[54] ELECTRICAL CONTACT MATERIAL

[75] Inventor: Akira Shibata, Yokohama, Japan

[73] Assignee: Chugai Denki Kogyo Kabushiki-Kaisha, Tokyo, Japan

[22] Filed: May 29, 1974

[21] Appl. No.: 474,173

[30] Foreign Application Priority Data

| | | |
|---|---|---|
| July 20, 1973 | Japan | 48-80705 |
| Nov. 26, 1973 | Japan | 48-131740 |

[52] U.S. Cl. .......... 75/173 A

[51] Int. Cl.[2] .......... B32B 15/00

[58] Field of Search .......... 75/173 A

[56] References Cited

UNITED STATES PATENTS

| | | | |
|---|---|---|---|
| 2,486,341 | 10/1949 | Stumbock | 75/173 X |
| 2,572,662 | 10/1951 | Richardson et al. | 75/173 X |
| 2,796,346 | 6/1957 | Stumbock | 75/173 |
| 3,472,654 | 10/1969 | Comey et al. | 75/173 |
| 3,607,244 | 9/1971 | Kabayama | 75/173 |
| 3,694,197 | 9/1972 | Zdanuk et al. | 75/173 |

FOREIGN PATENTS OR APPLICATIONS

| | | | |
|---|---|---|---|
| 611,813 | 11/1948 | United Kingdom | 75/173 |
| 1,153,178 | 8/1963 | Germany | 75/173 |
| 2,011,002 | 9/1971 | Germany | 75/173 |
| 2,012,910 | 10/1970 | Germany | 75/173 |

*Primary Examiner*—L. Dewayne Rutledge
*Assistant Examiner*—E. L. Weise
*Attorney, Agent, or Firm*—Shlesinger, Fitzsimmons & Shlesinger

[57] ABSTRACT

An alloy for composite electrical contact materials which is composed of 5 to 10 weight percent of tin and 1.0 to 6 weight percent of indium, the balance being silver, said alloy being subjected to an internal oxidation. The alloy may contain, when added by one or more other solute metal elements selected from zinc, antimony, lead and bismuth, as much as 6 to 15 weight percent of tin and said other solute metal elements in total in which the latter are less than 30 percent of the former. The alloy may also comprise up to 0.5 weight percent of ferrous or alkali earth metals.

4 Claims, No Drawings

ELECTRICAL CONTACT MATERIAL

This invention relates to electrical contact materials, and more particularly, it relates to novel silver-base metal oxide contact materials made by an internal oxidation.

Composite alloy metals of silver and cadmium oxides are generally known as silver and metal oxide alloys that may be produced by internal oxidation method and utilizable as electrical contact material, but others consisting of silver and other metal oxides are used practically on rather rare occasions. The present invention has been made on the basis of the research on the electric contact materials consisting of the composite of silver and oxides of metals other than cadmium and being free from pollution. As a result of the research on the various combinations of easily oxidizable elements of the III and IV groups of the Periodic Table as alloy or solute metals to silver matrix, it has been discovered that the combination of tin on one hand and indium on the other may be rather desirable. This result has shown unexpectedly that the composite contact materials obtained by this invention can not only replace conventional Ag-CdO materials made by an internal oxidation, but have hardness superior to that of Ag-CdO materials.

Among the examples of the composites for electric contact materials having the welding-resistant characteristics are the composite alloys of silver and tin oxide (8%) and silver and zinc oxide (8%). These materials are excellent in anti-welding properties but are rather inferior in their alloy structures and concentrations of oxides because they are made by powder metallurgy, and may be consumed very readily in case of too rapid and frequent switching operations.

While the internal oxidation method is known to be effective to take out with these defects, the manufacture of the alloy metals of the above composition by the internal oxidation method has so far been considered impossible for such reason that the diffusion velocity of these solute metal elements in the silver matrix is lower than that of cadmium, so that, when more than 5 weight percent of tin or zinc (as compared to 8% of tin and zinc in the above references) is added to and dissolved into silver and the resulting alloy is subjected to the internal oxidation, an unbalance in the formation and growth of oxide nuclei results in the course of oxidation and it leads to the formation of oxides precipitated concentratedly only about the surface of alloy, thus inhibiting the further progress of the internal oxidation.

It has now been discovered in this invention that, when 1 to 6 weight percent of indium having a faster diffusion velocity in the silver matrix than that of cadmium is added as a solute metal element together with tin, the formation of oxide nuclei and growth of oxide particles of solute elements about such nuclei may be well ballanced throughout an alloy, thus resulting in the smooth progress of the internal oxidation even when more than 5 weight percent of the solute metal elements are added to silver.

The working principle of this invention, especially of the function of indium added to silver matrix together with tin as solute elements thereto is summarized as follows.

In Wagner's law for the internal oxidation, depth thereof is expressed as a function of the diffusion velocity of oxygen in an alloy and others, in which the diffusion velocity of solute element in the alloy is however neglected. It is known however that diffusion velocity of oxygen (Dox) in alloy especially about its surface at the initial period of time of internal oxidation depends on the rate of penetration of oxygen into the alloy, viz., Ag-Sn alloy in this invention. And, routes of diffusion of oxygen in inner and deeper areas in the alloy are through the silver matrix dispersed with fine precipitated nuclei or particles of solute elements, Sn in this case. This means that the diffusion velocity of Sn (Dsn) in the alloy becomes an important factor for deciding the depth of internal oxidation in said Wagner's law especially in the oxidation mechanism at an initial stage thereof where the rate of penetration of oxygen about the surface of alloy is comparatively low and also in the oxidation mechanism at a later stage where the solute element Sn diffuses towards the precipitated oxide nuclei in the alloy and grows as oxide particles about the nuclei. Hence, said Dsn, the diffusion velocity of Sn has to be increased for the successful internal oxidation of the alloy containing Sn. It was found by microscopic observation that Dox/Dsn has to be preferably near to one. In order to satisfy this, indium is added to the alloy as mentioned above, since said solute element has solubility with tin, high affinity with oxygen and higher velocity when combined with Sn than Sn alone.

In addition, the melting and boiling points of $SnO_2$ and $In_2O_3$ are higher than those of silver, thus resulting in improving the refractory properties of the alloy contact material of this invention, also.

More specifically, it has been found in this invention that 5 to 10 weight percent of tin may preferably be added to silver. When more than 10 weight percent of the above element is added, formation of cracks and other defects may frequently be encountered in the course of internal oxidation because said element can not usually be a solid solution with silver at such high percentage, and thus worsening the workability of the metal alloy obtained. On the other hand, addition of less than 5 weight percent of said element results in the lowered anti-welding property. Addition of more than 6 weight percent of indium inhibits the progress of internal oxidation, while the addition of less than 1 weight percent of the same element results in a poor effect of cooperation or collaboration with tin and the reduced diffusion velocity of the solute metal in the silver matrix, thus interfering with oxygen diffusion owing to the retarded growth of oxide nuclei, and inhibiting the internal oxidation.

It has been recognized also that addition of the element of the iron or alkali earth metal group gives effect to the formation of the uniform microcrystals in the structure of internal oxidation.

EXAMPLE 1

An alloy consisting of 8 weight % of tin, 3 weight % of indium, 0.2 weight % of nickel and the balance of silver was prepared. The alloy was formed into a plate 2 mm thick by casting and rolling and subjected to the internal oxidation under oxidizing atmosphere at 700°C for 48 hours. The microstructure of the resulting product at its cross-section was similar to conventional Ag-CdO materials, and it had the following properties:

Hardness : HRF 85
Conductivity : IACS 75
Specific gravity : 10.03 g/cm$^3$

EXAMPLE 2

An alloy consisting of 8 weight % of tin, 5 weight % of indium, 0.5 weight % of magnesium and the balance of silver was prepared. The alloy was formed into a plate 2 mm thick by rolling and subjected to the internal oxidation under oxidizing atmosphere at 700°C for 48 hours. The resulting product had a cross-sectional microstructure similar to conventional Ag-CdO materials made by internal oxidation, and had the following properties:

Hardness : HRF 95
Conductivity : IACS 65
Specific gravity : 10.03 g/cm$^3$

A comparative test on the anti-weldability and consumability was carried out with the above invention products and the conventional contacts made of silver and cadmium oxide. The result of this comparative test is shown in the following Tables 1 and 2.

1. Test on anti-weldability.

Test conditions were as follows:
Voltage D.C. : 240 V
Initial current : 7,500 A
Contact pressure : 200 g The number of occurrence of welding as given in the following Table 1 is a mean value obtained by 20 times of measurements for each four sets of samples.

Table 1

| | Material | Number of welding occurrence |
|---|---|---|
| 1. | Ag-Cd 14% | 10 |
| 2. | Ag-Cd 14%-Ni 13% | 12 |
| 3. | Ag-Sn 8%-In 3%-Ni 0.2% | 0 |
| 4. | Ag-Sn 8%-In 5%-Mg 0.5% | 0 |

The test samples 3 and 4 are the materials obtained in accordance with the present invention by internally oxidizing the alloys of the above composition. The test samples were 6 mm in outside diameter and 2 mm in thickness.

The samples 3 and 4 above are the contacts produced from the alloy metals of the above composition and subjecting them to the internal oxidation according to the present invention. Though in the above examples moderate amounts of solute metal elements were employed in silver alloys, it was confirmed that the alloys of this invention could contain 5 to 10 weight percents of tin and 1.0 to 6 weight percent of indium, not adversely affecting their physical properties as given above.

It was also realized that less than 0.5 percent of ferrous or alkaline earth metals could be desirably added for preventing the cracks from forming at the time of internal oxidation as a result of the increase in the ratio of solute metals to the silver base.

It has been found also that in the present invention composite alloy electrical contact material, its silver matrix may contain an additional alloy element selected from zinc, antimony, lead and bismuth or combination thereof in addition to the aforementioned solute metal elements, tin and indium, provided that said additional alloy element be less than 30 percent of tin, the total amount of tin and said additional alloy element be 6 to 15 weight percent of the total weight of alloy, and the total amount of alloy and solute metal elements be 8 to 17 weight percent of alloy, with the balance being silver. In this case, the internal oxidation of alloy shall preferably be carried at an atmospheric pressure of more than 1.5 atm. It has been recognized also that the addition of less than 8 weight percent of alloy and solute metal elements to the silver matrix can hardly produce the desired oxide dispersed structures having good electric property, and that on the contrary, when the alloy and solute metal elements besides silver are added more than 17 weight percent, alloy obtained therefrom lacks in workability.

In order to the ready understanding of the composition of the second embodiment of this invention alloy, the composition is illustrated as follows:

(1) Sn (more than 70%)
(2) Zn, Sb, Pb, Bi — one or more (less than 30%)
[(1) + (2)]: 6–15 wt. % of the total alloy
(3) In (balance)
[(1) + (2) + (3)]: 8–17 wt. % of the total alloy
(4) Ag (balance)
(5) Ferrous or alkaline earth metal (when desired) less than 0.5 wt. %
[(1) to (5)]: 100%

2. Consumption as measured in the test prescribed in A.S.T.M.

Test conditions were as follows:
Voltage D.C. : 210 V
Current : 50 A
Contact pressure : 400 g
Opening pressure : 600 g
Frequency : 60 times per minute
Number of switching : 100,000

Average rate of consumption was measured for four sets of test samples as used in the anti-weldability test.

Table 2

| | Material | A.S.T.M. consumption rate (in mg) |
|---|---|---|
| 1. | Ag-Cd 14% | 12.0 |
| 2. | Ag-Cd 14%-Ni 0.3% | 10.5 |
| 3. | Ag-Sn 8%-In 3%-Ni 0.2% | 6.5 |
| 4. | Ag-Sn 8%-In 5%-Mg 0.5% | 8.5 |

EXAMPLE 3

An alloy, Ag-Sn 7%-Zn 3%-In 2% (in weight) was prepared and cast and rolled into a contact plate of 2 mm thickness. The plate was internally oxidized at 10 oxidizing atm. and at the temperature of 650°C for 72 hours. It had the following physical properties.

Hardness : HRF 90
Conductivity : IACS 65
Specific gravity : 10.1 g/cm$^3$

EXAMPLE 4

An alloy of Ag-Sn 4%-Pb 1%-Sb 0.5%-In 3%-Ni 0.3% (in weight) was prepared and rolled to a contact plate of 2 mm in thickness. The plate was subjected to an internal oxidation conducted at 1.5 oxidizing atm. and at the temperature of 650°C for 72 hours.

The obtained electrical contact had the following properties.

Hardness : HRF 80
Conductivity : IACS 70
Specific gravity : 10.3 g/cm$^3$

EXAMPLE 5

An alloy, Ag-Sn 7%-Zn 2%, Bi 1%-In 4%, Mg 0.5% was forged by rolling to a plate of 2 mm thickness. The plate was subjected to an internal oxidation conducted at 1.5 oxidizing atm. and at the temperature of 650°C for 72 hours in order to have a contact material having the following physical properties.

Hardness : HRS 95
Conductivity : IACS 60
Specific gravity : 10.03 g/cm$^3$

Comparative tests on the welding property were made between a conventional Ag-Cd contact and the present contacts of the above examples 3, 4 and 5 on the test conditions where voltage was D.C. 200 V, initial current 5,700 A, and contact pressure 200 g. Five sets of each samples (6 mm diameter - 2 mm thickness) were tested 20 times each. The results were as follows.

| Material | Number of occurrence of welding |
|---|---|
| Ag-Cd 15% | 4 |
| Ag-Sn 7%-Zn 3%-In 2% | 0 |
| Ag-Sn 4%-Pb 1%-Sb 0.5%-In 3%-Ni 0.3% | 1 |
| Ag-Sn 7%-Zn 2%-Bi 1%-In 4%-Mg 0.5% | 0 |

What is claimed is:

1. Electrical contact materials comprising an alloy having metal oxides precipitated therein as the result of internal oxidation and being composed of about 5 to about 10% by weight of tin, and 1.0 to 6% by weight of indium, the balance being silver.

2. Electrical contact materials as claimed in claim 1, the alloy containing a trace amount of less than 0.5% by weight of ferrous or alkali earth metals.

3. Electrical contact materials comprising an alloy having metal oxides precipitated therein as the result of internal oxidation at a pressure of more than 1.5 atm., and composed of 6 to 15% by weight of tin and one or more solute metal elements selected from the group consisting of zinc, antimony, lead and bismuth, said solute metal elements being less than 30% of said tin, and indium, the total amount of said tin, solute metal elements and indium being 8 to 17% by weight, the balance being silver.

4. Electrical contact materials as claimed in claim 3, the alloy containing a trace amount of less than 0.5% by weight of ferrous or alkali earth metals.

* * * * *